Feb. 28, 1933.  C. P. WELLMAN  1,899,172
METHOD OF AND MECHANISM FOR PACKAGING COMMODITIES
Filed Dec. 30, 1929  2 Sheets-Sheet 2
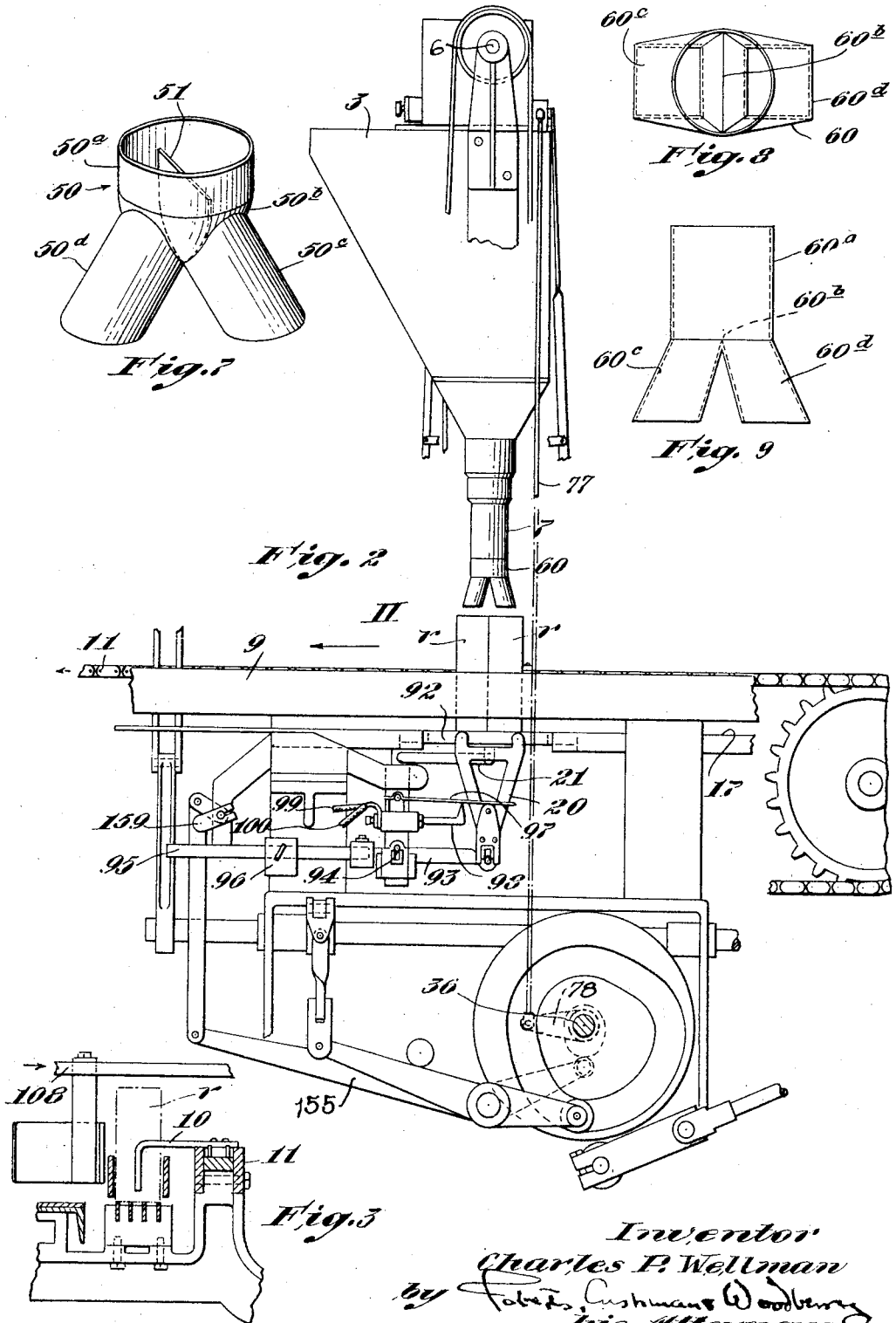
Inventor
Charles P. Wellman
by Roberts, Cushman & Woodberry
his Attorneys Patented Feb. 28, 1933

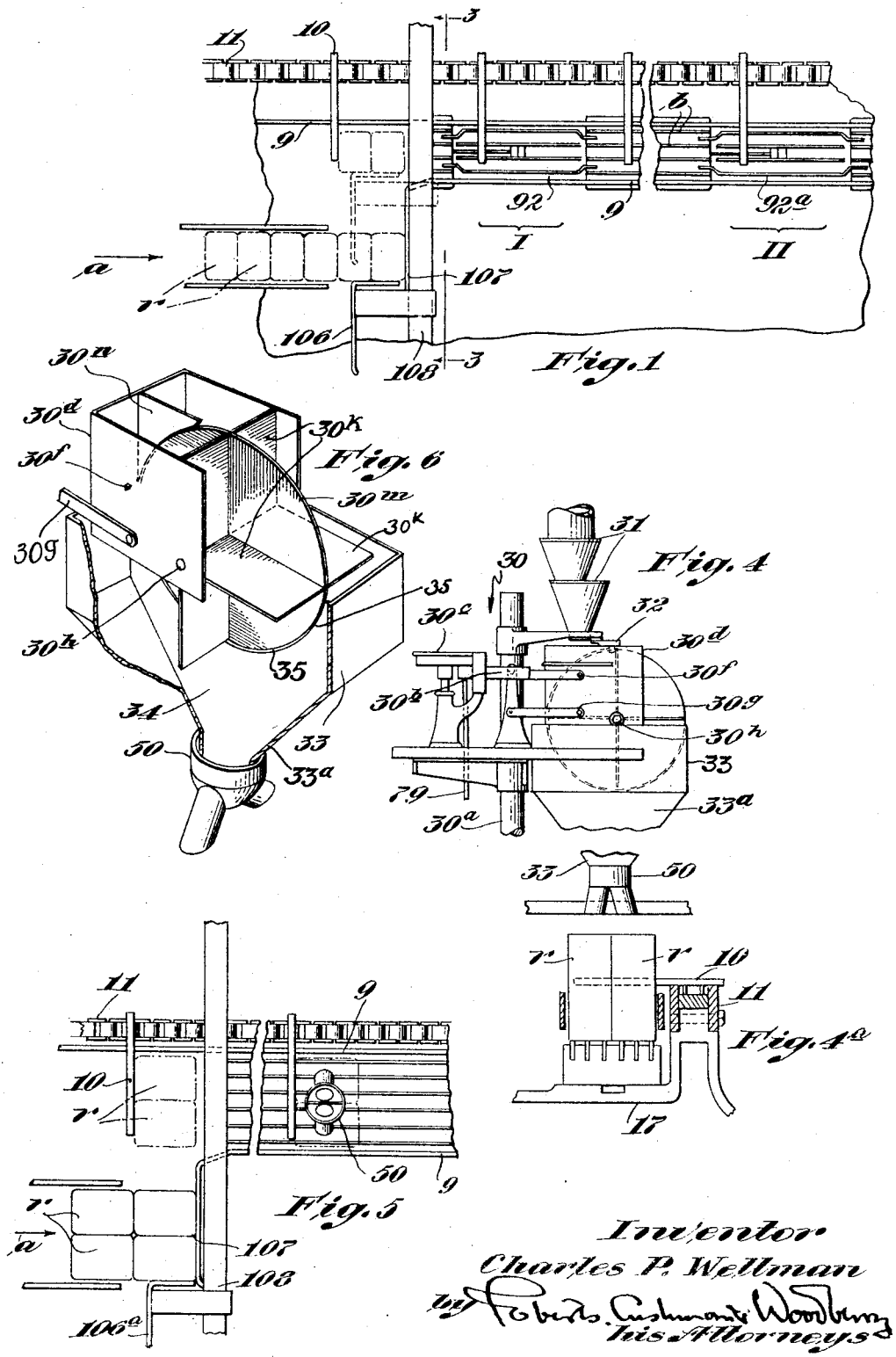

1,899,172

UNITED STATES PATENT OFFICE

CHARLES P. WELLMAN, OF MEDFORD, MASSACHUSETTS

METHOD OF AND MECHANISM FOR PACKAGING COMMODITIES

Application filed December 30, 1929. Serial No. 417,350.

This invention relates to the even division into containers of bulk commodities, for example such materials as crystalline or powdered chemical substances, grain, flour, sugar, spices, coffee, comminuted food products in general, and other merchandise sold by weight and desirably packaged in boxes, cans, bags, cartons, or other uniform receptacles, hereinafter referred to as receptacles. A receptacle typical of all others is a carton or flexibly stiff paper container, open at one end, and adapted to be closed after filling.

It is well known in the art to provide for making or for opening previously made receptacles, to convey these receptacles intermittently under the chute or feed spout of a filling device, to deliver a suitable charge, which may be automatically weighed, into each of the receptacles positioned to receive such a charge, to move the filled receptacles forward, and to close the filled package ends. This invention relates particularly to commodities which desirably are precisely measured and desirably precisely measured according to weight, so that there may be no variation from one receptacle to the other of the amount of its contents except well within a permitted toleration for variation of the amount of its contents. For example with respect to one pound packages, a variation of one-sixteenth of an ounce under or over weight may be tolerated; but it is desirable that a lesser variation than 0.39 per centum, represented by this tolerance shall be attained, since persistent underweight is unethical, and unlawful in some jurisdictions, whereas persistent overweight represents a loss to the dispenser of the commodities which, from their nature, represents a substantial proportion of the profit of the business.

Speed in the operation of filling and weighing charges into the containers is of the essence of the operation. Usually filling and weighing commodities is but one step in a series of operations having to do with opening, erecting, folding, closing, labelling, and wrapping and packing boxes or crates of the filled containers for shipment, and of all of these operations weighing and filling the charge is notoriously the slowest operation, and therefore represents a drag upon the entire operation of providing weighed filled containers, which it is one object of this invention to obviate.

This slowness of the weighing operation is primarily due to the high degree of accuracy required. Whether the weighing instrument is a scale beam, pan and weight or a spring balance, its sensitiveness to displacement by weights relatively small in proportion to the general mass of the attained weight, is measured by the time of displacement, so that scale mechanisms sensitive to percentage variations of the order of four-tenths or less of one per centum of the gross weight imply a necessary time to be displaced, after reaching a balanced state, varying with the gross mass displaced by gravity. Scale mechanisms capable of weighing one pound within the suggested limit of accuracy require, for example, more than one second and often more than two seconds for filling to weight and response to attained weight; whereas the adjuvant handling mechanism is quite capable of operating at speeds at or in excess of sixty packages per minute.

This has led inevitably to reduplicating the weighing mechanism, so that a supply of receptacles to be filled may be divided between two or more mechanisms; for example, the patent to Charles L. Bond, No. 1,729,991 dated October 1, 1929, for carton filling machine, describes and claims duplicate filling and weighing mechanisms to serve at the same time two streams of conveyed receptacles. In certain machine aspects, this invention has for one of its objects an improvement on the mechanism of the said patent, which may be consulted for parts and combinations retained unchanged, and not necessary to be here specifically described.

In the machine of the said patent, cartons intermittently moved in two streams are severally and singly stopped on scale platforms; a charge of the commodity is fed into the open end of the carton, and this filling operation continues until the gross weight of the carton and contents has reached a predetermined amount, whereupon the filling mechanism is automatically stopped, and the conveying mechanism moves forward another step.

One object of this invention is to provide for filling measured charges into receptacles intermittently moved in a stream of groups of receptacles in such a way as to provide for filling to a predetermined weight each of a plurality of receptacles by mechanism capable of gauging the amount of the commodity as accurately as the severally-acting or multiple weighing mechanisms heretofore resorted to; and at a higher speed; another object of the invention is to increase the total mass weighed at one weighing operation by performing the weighing operation, during or before filling, on or for more than one receptacle at once; and another object of the invention is to provide for filling and weighing receptacles within a predetermined degree of accuracy in the mass of the contents of each at a higher rate than heretofore, having regard to the number of weighing operations performed, and the number of filled receptacles delivered in a unit of time.

In its aspect as a machine, this invention is applicable to and provides for the improved operation of filling and weighing machines of either the kind known as net weighing machines adapted for weighing the charge to be inserted in the receptacle and then inserting it; or of the kind known as gross weighing machines adapted for weighing both the receptacle and the charge during the act of inserting the charge.

The invention will now be explained with the aid of specific instances only, presented by way of illustration and shown in the accompanying drawings, in which Fig. 1 is a plan view above the table of a filling and gross weighing machine showing delivery mechanism, intermittent receptacle feeding mechanism, and the scale platform and auxiliary mechanism at two commodity filling stations;

Fig. 2 is a rear elevation illustrating the filling mechanism, conveyor and weighing mechanism at one of the stations shown in Fig. 1;

Fig. 3 is a detail cross section on the line 3—3 of Fig. 1 illustrating receptacle transfer mechanism and receptacle conveyor mechanism;

Fig. 4 is a view corresponding to Fig. 2 illustrating the feeding and weighing devices of a filling and net weighing machine according to the invention;

Fig. 4ª is a vertical section in a plane at right angles to the plane of Fig. 4, showing conveying devices suitable for use with the devices of Fig. 4;

Fig. 5 is a plan corresponding to Fig. 1 illustrating receptacle transfer and conveying mechanism suitable for use in the devices of Fig. 4 and Fig. 4ª;

Fig. 6 is a detail perspective illustrating a preferred type of net weighing feeding device;

Fig. 7 is a perspective illustrating a bifurcated commodity feed delivery device of one kind recommended to be employed with the devices of Fig. 4;

Fig. 8 is a plan, and

Fig. 9 is a rear elevation of a bifurcated feed delivery device recommended to be employed with the devices of Fig. 2.

In Fig. 1, the invention is illustrated by a machine utilizing two filling and weighing stations operating during the same interval of time on successive groups of receptacles of a stream or series of receptacles moving from left to right, as shown in the figure, continually but intermittently. While within the invention the receptacles might be filled at one operation, in the form shown in Fig. 1, at the station marked I, any receptacle receives a charge somewhat less than the finished charge for that receptacle by the operation of a bulk feeder, and having received the bulk, which is weighed, each receptacle proceeds to station II, where a dribble or make-up charge of the material is fed to the receptacle, the stream of commodity fed at station II being automatically stopped when the total weight reaches the predetermined required amount. Receptacle filling mechanism of satisfactory operation to deliver commodities in correct quantities at predetermined rates to receptacles are well known in the art, and with slight modification to be explained below, may be employed at stations I and II. These may, for instance, correspond to devices illustrated in my Patent No. 1,115,633, November 3, 1914, for feeder for automatic weighing machines; or they may correspond to the devices for this purpose shown in the patent to Doble No. 714,875, December 2, 1902; or the devices of the said Bond patent or any other satisfactory bulk and dribble feeding devices might be employed. These devices may, within the invention, be modified only in respect to their capacity for delivery simultaneously to the several receptacles to be filled, as presently mentioned in detail.

The device for conveying a series of receptacles to be filled into the machine in the direction of the arrow $a$ (Fig. 1) may be any belt or other device of the prior art; the devices for intermittently conveying packages through the machine past the stations I and II may be the devices, without substantial change, of the said patent to Bond No. 1,729,991, which may be consulted for recommended construction and operation, and I do not herein illustrate matters corresponding to the devices of one of the duplicate sides of the illustrative machine of the said Bond patent. The table 17, for example, the receptacle driving chain 11 and drivers 10, and the scale mechanism shown in Fig. 2, may be substantially the same as those disclosed in said Bond patent and need not be particularly described. Preferably, as in the said Bond patent, attainment of overbalance by a scale mechanism closes an electric circuit and stops feeding thereby; but any reliable indication such as the movement of a valve in a fluid pressure conduit or working of a mechanical connection might be resorted to. Whenever the scale platform 92 or 92ª, illustrated in Fig. 2, is depressed by the weight of the package, and the electrical circuit closer 97, 98 makes contact, a magnetically actuated clutch mechanism is actuated to cease feeding the commodity into the receptacle, and as a consequence of this actuation, another clutch mechanism is automatically operated, which causes the chain 11 and the drivers 10 to move forward through one step, all as in said Bond patent.

Referring now to Fig. 1, empty receptacles r arriving by belt conveyor, gravity chute, or other means in the direction of the arrow a are delivered onto the machine table 17, and brought up against a stop 107. According to the present invention empty containers arriving at the stop 107 are transferred in groups, for example two at a time, into the path of the drivers 10. For this purpose a transfer mechanism comprising a reciprocating rod 108 and a driver 106 wide enough to overlap the two end members of the series and long enough not to pass the end of the arriving column of receptacles r and operating in one direction only of a stroke of said driver may be constructed and operate otherwise according to the said Bond patent. The drivers 10 are separated to a greater extent than the longitudinal dimension in the direction a of the arrival of two adjacent receptacles. As in said patent, the receptacles may slide on their bottoms along a way made of the upper edges of polished bars b between lateral guides 9 supported and operated as in said patent. The scale platform 92 at station I and the scale platform at station II may, as in said patent, comprise a series of similar bars having members extending between the ends of the bars b so that the platform 92 normally continues the bars b as illustrated in Figs. 1 and 2.

As best shown in Fig. 2, platform 92 may be supported by a hollow frame member 20 connected by a horizontal link 21 to a lug under the machine table and supported by one end of the scale beam 93 and the usual knife edge bearings at the lower end of the frame 20 and at 94. An adjustable weight 96 on the end 95 of the beam 93 determines the weight at which depression of the platform 92 will occur. The platform 92 may be locked against depression by the mechanism of said Bond patent, as shown at 159, 155, according to the rotary position of the intermittently actuated drive shaft 36, motion of which shaft through the connections explained in the said patent may be relied upon to actuate the receptacle conveyor 10, 11, and the transfer driver 106.

When circuit is closed between the contacts 97, 98 and current leads 99, 100 the commodity filling mechanism above the platform 92 ceases operation. When the operation of the feeding mechanisms above station I and station II, Fig. 1, have both ceased, the shaft 36 is actuated according to the mechanism explained in said patent. One of the consequences of this is the further motion of the receptacle conveyor 11.

According to the construction of the conveyor 10, 11 explained above, the operation results in stopping on each scale platform 92 for weighing two receptacles at each forward motion of the drivers 10. These drivers may recoil as explained in said patent.

Referring now to Figs. 2 and 7, in the gross weight type of machine the preferred feeding device, which may be actuated as explained in the said Bond patent or in my said patent, may comprise a receptacle 3 for the commodity having in it any usual or desired mechanism respectively at station I or station II, for simultaneously feeding at station I bulk charges less than the predetermined weight at a relatively high rate, and for feeding at station II dribble or make-up charges at a relatively low and continuous rate, and for dividing these charges into equal and separate flows. For example, a supply of material may be introduced into the hopper 3, from which suitable devices (for example those of said Bond patent) deliver a stream of the material, when operative, into the depending portion 7.

The operation of any of the feeding devices to deliver material into receptacles placed to receive the material, except as explained below, may be the same automatic operation as explained in said Bond patent. The constantly driven shaft 6, Fig. 2, for driving the devices of said patent in the hopper 3 to cause feeding may be clutched to or released from said devices by the clutch shifter mechanism of said patent, which in brief comprises an operating connection 77 between the clutch shifter at shaft 6 and a crank 78 on the shaft 36, which shaft 36 moves whenever the conveyor mechanism 10, 11 advances a step to place receptacles to be filled under the delivery orifices of the feeding devices at station I or II, so that beginning to feed the filling material is a consequence of operation of the devices operating to deliver receptacles in position to be filled. Cessation of feed of the filling and resumption of motion of the packages past the filling stations is a consequence of depression of the scale platform at that filling station by the aggregate weight of the filled packages as explained above. For the purpose of filling at the same rates and simultaneously two receptacles r which have been brought under the delivery end of the filling device by the drivers 10, the stream of material is divided evenly between the orifices of a bifurcated feed delivery device 60, Figs. 2, 8 and 9, the ends of which as shown respectively deliver into the open ends of receptacles r. This device 60 may comprise a cylindrical upper portion 60$^a$ fastened to the lower end of the delivery tube 7, in which a diametrically placed knife-edge partition 60$^b$ defines the juncture of two inclined spouts 60$^c$ and 60$^d$, and divides the flow between said spouts.

The principle involved will now be apparent. The movement of the receptacles to and from, and the movement of the commodity into and cessation of that movement into receptacles, at a meeting point, is controlled by the aggregate weight of a plurality of receptacles each receiving a moiety of the commodity at said meeting point.

I have found that the device of the dividing edge 60$^b$, in connection with the bifurcated spout 60$^c$, 60$^d$, is reliable to divide the delivery stream of any commodity of the general class mentioned above into two streams, whose flow under gravity or the impulsion of the discharge apparatus in that filling device of any of the known types, (for example that sufficiently indicated in my said patent, or in the said Bond patent), results in two streams in which like unit weights reliably flow during given intervals of time, within the permitted variation of mass or weight adverted to above.

A consequence of these provisions is that two receptacles r receive a load to be weighed upon platform 92 during each stoppage of a pair of receptacles r on the platform 92, and that for any given commodity, the charges flowing into the two receptacles r, r are equal at any given time. The scale device 92, 93, 95 is therefore set to be displaced by the weight of the quantity of the contents of two packages rather than of one package, and the scale beam tips to effect a contact at 97, 98 upon the accretion of double the weights of the contents and the tare represented by the weight of the receptacles r desired for each package.

One result of filling the packages in this manner is to double the production of filled packages during each pause for weighing, and to reduce the necessary delay for filling and the action of the scale beam to at most one-half the time required for weighing the packages one by one. This has been done without any decrease whatever in the accuracy of the weighing as applied to two packages, and it has been done within the permitted variation in weight of the contents of any package as compared with that of any other package. That is to say, the operation has been performed with gains represented at a minimum by these factors. In actual fact the gain is larger when the total weight available to tip the scale beam 93, 95 has been doubled, and therefore the time of swing of the scale beam at completion of the expected load also has been halved. The aggregate stream of commodity flowing to the scale is twice as great in volume and in rate; the scale will therefore operate to stop the filling stream and initiate the other motions in less than half the previous time for single-package weighing. Since the rate of the dribble stream effective to tip the scale may be twice as great in the same time, the bulk delivery at station I may be set to approach the predetermined gross weight as nearly as for a single package, and the dribble stream at station II may deliver to each receptacle only half the weight necessary for single-package weighing; this results in lessening the variation between successive double bulk loads and the predetermined finished weight, and further reduces the time at station II. Because of the verified accuracy of the mechanical division of the filling streams, the variation of any individual package from a standard weight may be reduced on slowing the feed-streams, to at most one-fourth of the variation achieved by single-weighing packages of the same weight of contents by the existing machines and methods at the present rate of production. By the expedients explained, bulk and completing or dribble feed weighing can therefore be carried out at at least twice the known rate, within the degree of accuracy permitted, for example to within one-sixteenth ounce to the pound. In connection with this advantage, the more expensive parts of an expensive machine, for a given production, have been reduced in number by one-half.

It will be obvious that within the limits of accuracy of division of a flowing stream in the filling apparatus, the number of packages delivered to the scale platform 92 for weighing as an aggregate weight may be increased beyond two.

The invention has been explained above in connection with a gross weighing machine, in which the receptacles r are weighed with the commodity. The invention is capable of expression in other types of weighing machine. For example in Figs. 4, 4$^a$, 5 and 6, I have shown a machine in which the feed table 17 and conveyor device 11, together with the means for actuating the same, may be substantially the same as that mentioned above, but in which the weighing machine indicated generally at 30 is of the net weighing type comprising a standard 30$^a$ on which is mounted a scale mechanism comprising a beam 30$^b$, and weight pan 30$^c$, the beam 30$^b$ being forked to carry between its ends a casing 30$^d$ for a rotating series of weighing compartments adapted to be released on downward motion of the casing 30$^d$ when the counterweight on the beam 30$^b$ is overcome. For example, casing 30$^d$ may be of sheet metal defining three sides of a six-sided solid and pivoted to beam 30$^b$ at 30$^f$ by the usual knife-edge bearings on lugs of the casing in holes in the scale beam 30$^b$, and preferably also supported by a forked link 30$^g$ pivoted to casing 30 and the scale standard for parallel motion downwardly by gravity. The casing 30$^d$ provides a bearing for a shaft 30$^h$ rigid with vanes 30$^k$ at right angles to each other. These vanes with the three walls of the casing 30$^d$ form a rectangular receiver for delivery of the commodity from above through the hopper spouts 31. Each quadrant of the wheel made up of the vanes 30$^k$ thus forms with casing 30$^d$ a compartment, which when filled through the spout 31 tips the scale beam and is as a consequence rotated on the axis at 30$^h$ to deliver its weighed load. As usual, the weighing wheel in casing 30$^d$ may be released on dropping below a detent 32, Fig. 4, mounted on the lower end of the delivery spout 31.

In order to carry out the principles explained above, the weighing receptacle 30$^d$, 30$^k$ is vertically subdivided. For example, a circular plane disk 30$^m$ is erected centrally between the lateral walls of the casing 30$^d$ whereupon the delivery through the spout 31 is mechanically divided between the lateral walls of the casing 30$^d$ into two parts, the aggregate weight of which determines the discharge of the weighed load.

The casing 30$^d$ may comprise, in the plane of the disk 30$^m$, a fixed partition 30$^n$.

As usual the weighed load in the net weigher is received in a funnel hopper 33, whereupon, in order to maintain division of the weighed load and provide distribution into two or more packages, a partition 34 having a circular opening 35 may be relied upon to continue the division through the funnel hopper 33 and 33$^a$ leading to the positioned receptacles. At the bottom of the funnel hopper 33$^a$ the bifurcated spout 50 of Fig. 7, for example, may be placed to deliver into the receptacles $r$ respectively. Spout 50 comprises a cylindrical collar 50$^a$ merging into a body 50$^b$ communicating with the tubular legs 50$^c$ and 50$^d$, and having a thin diametrical partition 51. In the instance shown, it is desirable to position two receptacles $r$, $r$ at once side by side with each other in respect to the direction of their advance through the machine; for example referring now to Fig. 5, the conveyor 11 is provided with drivers 10 and with side guides 9 appropriately spaced to receive two receptacles $r$ abreast; the reciprocating transfer rod 108 is provided with a driver 106$^a$ appropriate to pushing off the leading pair of the stream of receptacles $r$ stopped against the stop 107, Fig. 5, during the position of rest of the intermittent motion of the drivers 10, so as to bring two of the receptacles $r$ side by side under the bifurcated delivery spout 50.

In net weighing machines of the kind referred to, empty receptacles may be advanced under the filling spouts at any times except when a stream of material is actually flowing through the delivery device 50. It is therefore satisfactory in such a machine to cause the conveyor 11 to move to advance a new pair of receptacles $r$ during the latter part of the time required to fill one of the compartments of the receiving weigher. To this end the devices described in the said Bond patent for operating a clutch to drive a shaft 36 itself geared through intermittently operating gearing to a sprocket operating the conveyor chain 11 may be resorted to without change, one of the clutch releasing connections 79 in the said patent being arranged as shown in Fig. 4, to be depressed by the scale beam on upward motion of the casing 30$^d$ after the delivery of a weighed load to initiate the advance of a pair of empty receptacles. Any other tripping connection might be resorted to.

In the net weighing device, it will be apparent, the commodity feed may be continuous, but it will be understood that any or all of the mechanisms of the machine may be arranged to be automatically stopped on the occurrence of faulty operation or the absence of receptacles, or commodity, by the usual devices.

Viewed in one aspect, the net-weighing devices of this application provide as a part of the machine an endless series of receptacles brought into position to receive divided flows of the commodity, which, upon reaching a predetermined aggregate weight, operate to cut off flow into said receptacles, to transfer the several charges contained therein to the packaging receptacles, and to position a new plurality of receptacles to receive further flow.

The species of this invention embodied in the machine of Figs. 4, 4$^a$, 5, 6 and 7, is claimed in my application Serial No. 551,628, filed July 18, 1931, a division of this application.

I claim:

1. The art of packaging commodities in receptacles by weight comprising as steps measuring the aggregate weight during simultaneous filling of a plurality of receptacles, and causing and controlling according to said weight movement toward and from the place of filling of a series of said receptacles, and of the flow of substantially equal streams of the commodity into the receptacles severally at said place.

2. The art of packaging homogeneous commodities in receptacles comprising as steps causing to flow and dividing into like parts a stream of the commodity, guiding the parts of the stream severally into each of a plurality of the receptacles, and causing a plurality of the receptacles to move to position to be filled by said stream and simultaneous cessation of flow of said parts of the stream when the receptacles shall have received an aggregate predetermined weight of the commodity.

3. The art of packaging free-flowing comminuted commodities in receptacles comprising as steps permitting the commodity to flow in substantially equal streams severally into each of a plurality of empty receptacles, and moving the filled receptacles away from and positioning a new plurality of receptacles to receive said streams, and cutting off the flow of the commodity when a plurality of the receptacles shall have received a predetermined aggregate weight of the commodity.

4. The art of packaging homogeneous commodities in receptacles comprising as steps positioning at a place for filling a plurality of receptacles of a series of receptacles moving toward and from said place each to receive a flow of the commodity, causing to flow and dividing into like parts a stream of the commodity, guiding the parts of the stream severally into the receptacles, and causing removal of the filled receptacles, positioning of a new plurality of empty receptacles, and simultaneous cessation of flow of said parts of the stream of commodity when the receptacles shall have received an aggregate predetermined weight of the commodity.

5. The art of packaging homogeneous commodities in receptacles comprising as steps causing movement of a plurality of receptacles each to a position to receive a flow of the commodity, causing as a consequence of said movement a flow and division into like parts of a stream of the commodity, guiding the parts of the stream severally into the receptacles, causing as a consequence of the aggregate weight of said receptacles when the receptacles shall have received an aggregate predetermined weight of the commodity, simultaneous cessation of flow of said parts of the stream of the commodity removing the filled receptacles, and moving another plurality of receptacles into position to receive charges of the commodity.

6. The art of measuring and filling homogeneous commodities in substantially like quantities into receptacles, comprising as steps, causing movement of a plurality of empty receptacles to a position to receive severally flows of the said commodity, causing after arrival at said position a flow in a duct of a stream of the commodity, dividing the flow by the interposition of a partition in the duct, leading the divided flows severally to said receptacles, and simultaneously causing cessation of said divided flows movement of filled receptacles away from said position and movement of a new plurality of receptacles to said position as a consequence of the attainment of a predetermined aggregate weight of the commodity in said receptacles collectively.

7. Machine for packaging commodities having therein means for positioning empty receptacles to be filled with measured charges of the commodity, means for causing a flow of the commodity in a duct, means for dividing the flow and guiding the divisions severally into the positioned receptacles, means for causing simultaneous cessation of flow into each of said receptacles, and means actuated by the aggregate weight of the commodity for causing said cessation of flow.

8. Machine for packaging commodities having therein means for causing a flow of the commodity in a duct, means for dividing the flow and guiding the divisions severally into a plurality of positioned receptacles, means for causing simultaneous cessation of flow into each of said receptacles, means actuated by the aggregate weight of the commodity for causing said cessation of flow, and means actuated as a consequence of actuation of the means for causing said cessation for removing filled and positioning empty receptacles for filling.

9. Machine for packaging commodities having therein a plurality of stations for receptacles, means for filling the receptacles at each of said stations, means for moving groups each of a plurality of receptacles to said stations in succession in steps, means for dividing a flow of the commodity and guiding the divided flow to said receptacles severally at each of said stations, and means at said stations adapted to be actuated by the aggregate weight of said group of receptacles for causing cessation of flow of the commodity.

10. Machine for packaging commodities having therein a plurality of stations for receptacles, means for filling the receptacles at each of said stations, means for moving groups each of a plurality of receptacles to said stations in succession in steps, means for dividing a flow of the commodity and guiding the divided flow to said receptacles severally at each of said stations, and means at said stations adapted to be actuated by the aggregate weight of said group of receptacles for causing cessation of flow of the commodity and for thereafter causing the means for moving the receptacles to advance through a step.

11. Machine for packaging commodities having therein means for causing flow of a bulk charge of a commodity in a duct at one station in the machine, means for causing flow of a dribble charge of the said commodity in a duct at another station in the machine, means for dividing the flows in said ducts severally into like streams, means for positioning groups of receptacles at said stations severally to receive severally the divided flows, means at each of said stations for weighing the aggregate received flow of said commodity in said groups of receptacles severally, and means actuated upon the attainment of a predetermined weight of one of said groups for causing cessation of flow of commodity to the receptacles of said group.

12. Machine for packaging commodities having therein means for causing flow of a bulk charge of a commodity in a duct at one station in the machine, means for causing flow of a dribble charge of the said commodity in a duct at another station in the machine, means for dividing the flows in said ducts severally into like streams, means for positioning groups of receptacles at said stations severally to receive severally the divided flows, means at each of said stations for weighing the aggregate received flow of said commodity in said groups of receptacles severally, means actuated upon the attainment of a predetermined weight of one of said groups for causing cessation of flow of commodity to the receptacles of said group, and means automatically actuated upon the operation of said means for causing cessation at both of said stations for moving the receptacles from one station to another station.

13. In a machine for packaging commodities in receptacles, the combination of an intermittently actuated conveyor, means for delivering receptacles to the machine, means for transferring receptacles in groups of a number at a time to said intermittently actuated conveyor, filling means for said receptacles operative at a station reached by a group of said receptacles upon one step of motion of said conveyor, weighing means for the aggregate flow of commodity to said group of receptacles adapted to cause cessation of flow after the delivery of a predetermined weight, and means controlled by said weighing means for causing said conveyor to advance another step.

14. In a machine for packaging commodities in receptacles, the combination of a conveyor intermittently actuated to advance through steps of constant length, means for delivering receptacles to the machine, means for transferring receptacles in groups of a number at a time to said intermittently actuated conveyor, filling means for said receptacles operative each at a station reached by a group of said receptacles at the end of one step of motion of said conveyor, weighing means at each of said stations for the aggregate flow of commodity to said group of receptacles adapted to cause cessation of flow after the delivery of a predetermined weight, and means controlled by said weighing means collectively for causing said conveyor to advance another step.

15. In a weighing device for packaging machines, in combination with a commodity hopper and a delivery duct, a spout having a dividing partition and inclined ducts severally adapted to guide separate flows of the commodity to different receptacles, in combination with a scale platform, means for conveying groups of receptacles to position on said platform to receive each one of said flows, and means for inducing flows of the commodity upon arrival of said receptacles on said platform.

16. In a weighing device for packaging machines, in combination with a commodity hopper and a delivery duct, a spout having a dividing partition and inclined ducts severally adapted to guide separate flows of the commodity to different receptacles, a scale platform and means for moving a plurality of receptacles each to receive flow from one of said ducts on to and off of said platform, and means operated as a consequence of displacement of said platform for causing said motion.

17. In a weighing device for packaging machines, in combination with a commodity hopper and a delivery duct, a spout having a dividing partition and inclined ducts severally adapted to guide separate flows of the commodity to different receptacles, a weighing device adapted to receive a plurality of receptacles at the same time, means for positioning a plurality of receptacles each to receive flow from one of said ducts, and means for operating said positioning means consequently upon indication by the weighing device of a predetermined weight.

18. A weighing machine for flowing material having therein a divided chute constructed and arranged to provide substantially equal flows of the material in each of its divisions, a scale adapted to support a plurality of receptacles in position to receive the material from the chute, means for starting simultaneous flow to said receptacles as a consequence of the attainment of one position by the scale, and means for stopping simultaneously the flow to said receptacles as a consequence of the attainment of another position by the scale.

19. A measuring machine for flowing material having therein a divided chute constructed and arranged to provide substantially equal flows of the material in each of its divisions, a depressible platform adapted to support a plurality of receptacles in position to receive the material from the chute, and means acting as a consequence of the attainment of predetermined positions by the platform to start and stop the flow to each of said receptacles simultaneously.

Signed by me at Boston, Massachusetts, this 27th day of December, 1929.

CHARLES P. WELLMAN.